United States Patent
Saito et al.

[11] Patent Number: 6,138,248
[45] Date of Patent: Oct. 24, 2000

[54] COMMON DISK UNIT MULTI-COMPUTER SYSTEM

[75] Inventors: Masahiko Saito; Hidehito Takewa; Kenichi Kurosawa; Yoshihiro Miyazaki, all of Hitachi; Shigenori Kaneko, Hitachinaka, all of Japan

[73] Assignee: Hitachi, Ltd., Tokyo, Japan

[21] Appl. No.: 09/001,224

[22] Filed: Dec. 30, 1997

[30] Foreign Application Priority Data

Jan. 17, 1997 [JP] Japan ..................................... 9-006538

[51] Int. Cl.$^7$ ....................................................... G06F 11/16
[52] U.S. Cl. .......................................... 714/11; 395/800.01
[58] Field of Search .................................. 714/11, 2, 3, 5, 714/6, 7, 8, 10, 13, 15, 18, 20, 25, 47, 48, 12, 23, 24; 395/500.05, 800.01, 800.09; 364/266.5, 267.6, 268.9

[56] References Cited

U.S. PATENT DOCUMENTS

| | | |
|---|---|---|
| 5,361,267 | 11/1994 | Godiwala et al. ..................... 371/40.1 |
| 5,440,726 | 8/1995 | Fuchs et al. .......................... 395/82.18 |
| 5,471,609 | 11/1995 | Yudenfriend et al. ............. 395/182.02 |
| 5,530,946 | 6/1996 | Bouvier et al. ..................... 395/182.21 |
| 5,627,962 | 5/1997 | Goodrum et al. .................. 395/182.11 |
| 5,751,955 | 5/1998 | Sonnier et al. ..................... 395/200.19 |
| 5,805,785 | 9/1998 | Dias et al. .......................... 395/182.02 |
| 5,805,790 | 9/1998 | Nota et al. .......................... 395/182.08 |
| 5,812,757 | 9/1998 | Okamoto et al. .................. 395/182.09 |
| 5,815,651 | 9/1998 | Litt ..................................... 395/182.08 |
| 5,838,894 | 11/1998 | Horst ................................. 395/182.09 |
| 5,884,018 | 3/1999 | Jardine et al. ...................... 395/182.02 |

*Primary Examiner*—Nadeem Iqbal
*Attorney, Agent, or Firm*—Kenyon & Kenyon

[57] ABSTRACT

A computer and a backup computer exchange periodic report signal transmissions by way of SVP115. When there is no periodic report signal transmission from the main computer, the backup computer makes a main computer status inquiry and if one location is malfunctioning resets the main computer by way of the SVP115 and continues the processing. When permanent damage is present, the SVP115 continually resets the main computer and controls MOS switches of the common disk unit to isolate the SCSI from the main computer and continue the main computer processing.

10 Claims, 14 Drawing Sheets

FIG. 5

MESSAGE STORAGE MEMORY

| TRANSMIT MESSAGE 1 | RECEIVE MESSAGE 1 | POWER SUPPLY STATUS |
| TRANSMIT MESSAGE 2 | RECEIVE MESSAGE 2 | FAN |
| ⋮ | RECEIVE MESSAGE 3 | TEMPERATURE |
| | | PARITY |
| | | ⋮ |

| STATUS \ SWITCH | 150 | 151 | 152 | 153 |
|---|---|---|---|---|
| a) DUAL SYSTEM OPERATION STATUS | ON | OFF | OFF | ON |
| b) COMPUTER 100 DELETE STATUS | OFF | ON | OFF | ON |
| c) COMPUTER 101 DELETE STATUS | ON | OFF | ON | OFF |
| d) DISK NON-USABLE STATUS | OFF | OFF | OFF | OFF |

FIG. 15

| TYPE OF MESSAGE | TRANSMIT SOURCE | FINAL RECEIVER | CONTENTS |
|---|---|---|---|
| REPORT SIGNAL | CONTROL PROGRAM | CONTROL PROGRAM | SELF-REPORT |
| SINGLE RESET COMMAND | CONTROL PROGRAM | SVP BOARD COMPUTER | RESTART OF MATCHING COMPONENT |
| PERIODIC RESET COMMAND | CONTROL PROGRAM | SVP BOARD COMPUTER | RESET MATCHING COMPONENT & CONTINUE |
| DISK SELECT COMMAND | CONTROL PROGRAM | SVP BOARD OF COMMON DISK UNIT | MOS SWITCH SELECT FOR COMMON DISK UNIT (INTERNAL) |
| DISK STATUS REPORT MESSAGE | SVP BOARD OF COMMON DISK UNIT | CONTROL PROGRAM | STATUS REPORT ON COMMON DISK UNIT |
| STATUS CHECK COMMAND | CONTROL PROGRAM | SVP BOARD COMPUTER | CHECK REQUEST FOR COMPUTER STATUS |
| STATUS REPORT MESSAAGE | SVP BOARD COMPUTER | CONTROL PROGRAM | REPORT COMPUTER STATUS |

COMMON DISK UNIT MULTI-COMPUTER SYSTEM

BACKGROUND OF THE INVENTION

Field of the Invention

The present invention relates in general to multi-computer systems comprised of a main computer and a backup computer and relates in particular to multi-computer systems equipped with a common disk unit for use as an external memory device by the main computer and backup computers.

Generally, a multi-computer system is utilized when high reliability is required of personal computers which are inferior to large-scale computers for certain applications such as railroad management, industrial plant operations or control of utility power supply systems. The multi-computer system makes use of backup or slave personal computers in a preferably fault-tolerant system in which the backup computer takes over the processing performed by the main computer when some kind of breakdown or malfunction has occurred in the main computer.

Some examples of multi-computer systems utilizing personal computers in this way are the Netware SFT III system by the Novell Company (USA) and the Standby Recovery Server by the Compaq Company (USA).

In the Netware SFT III system a main computer and a backup computer are each connected to an expansion port with the expansion port linked to an optical fiber network. The expansion ports of both computers work in a mutually coordinated manner by means of the optical fiber network to periodically copy the memory of the main computer into the backup or slave computer. Further, each computer monitors the other so that if the signals from the main computer are cutoff, the backup or slave computer will take over the processing by utilizing the data copied from the main computer.

In a system such as Netware SFT III system, the data contents from the disk unit of the main computer are copied into the disk unit of the backup or slave computer so that the main computer and the backup computer do not share a common disk unit.

The above mentioned Standby Recovery Server generally utilizes a method referred to as "Cold Standby". This cold standby system is different from (hot standby) systems such as the Netware SFT III in that the backup computer cannot instantly take over the processing from the main computer.

In the Standby Recovery Server, the main computer performs the processing, while the OS (operating system) of the backup computer is in standby.

The carrying over of data between the main computer and the backup or slave computer is performed by a common disk unit utilized by both the main and the backup computer.

In the Standby Recovery Server, the backup computer is in a state equivalent to standby and cannot be started and the common disk unit can only be utilized by one computer so that the main computer will be stopped when a breakdown occurs.

More specifically, both computers mutually monitor each other and when the signal from the main computer is cut off, the backup (or slave) computer first switches the I/O (input/output) of the common disk unit from the main computer to the backup computer. Next, the backup computer loads the OS (operating system) and installs a file system into the common disk unit. Finally, the backup computer loads and runs the application program needed for the processing that had been performed by the main computer. In this way the Standby Recovery System carries over the data by switching the input/output of the common disk unit from the main computer to the backup computer when a malfunction occurs in the main computer.

The technology for mutual monitoring in the multi-computer system is listed in Japanese Patent Laid-Open No. Sho 58-214952. A technology is also known in which a plurality of service processors each mutually send periodic signals to indicate correct operation and when the main processor no longer sends a signal indicating correct operation, another main service processor is selected from among subordinate service processors.

Also, rather than a fault-tolerant system, a multi-processor system for performing processing with a plurality of processors arranged in parallel is known in Japanese Patent Laid-Open No. Hei-4-2483. In the technology proposed here, when a malfunction occurs in the processor, a processor selected beforehand is used as the control processor and monitors the status of each processor. The technology for resetting a processor when an error occurs is also described.

In the above related Netware SFT III, the provision of a large capacity transmission path between the expansion ports was necessary due to the need to copy the contents from the main computer onto the backup computer. Therefore, optical fiber was used in this Netware SFT III as the transmission path between the expansion ports between the main computer and the backup computer. However, methods such as the use of large capacity optical fibers as the transmission path cause an extremely large increase in the cost of a multi-computer type system.

In the above related Standby Recovery Server on the other hand, a common disk unit is utilized to carry over data from the main computer to the backup computer so that there is no need for the large capacity transmission path used in Netware SFT III.

However, in order that the common disk unit can be utilized by the backup computer when the main computer malfunctions in the Standby Recovery Server, a file system has to be installed in the backup computer. Here, restarting of the operating system is necessary so that this file system must be installed in order to use a typical personal computer operating system such as WindowsNT or Windows95.

Therefore, in the Standby Recovery Server the backup computer is in standby with the OS (operating system) still not loaded. When a breakdown or malfunction in the main computer occurs, this OS is loaded and the common disk unit incorporated into the file system. However in this kind of method, several minutes is required from the time of the malfunction until the backup computer can take over the processing tasks.

Further, these computer malfunctions may have different circumstances and degree of severity along with a different likelihood of recovery such as due to power supply errors, heat runaway, fan malfunctions or parity errors, etc. Accordingly the design of the multi-computer system should take into account the extent of these malfunctions and suitable countermeasures.

SUMMARY OF THE INVENTION

In view of the above problems it is therefore an object of this invention to provide a low-cost multi-computer system which can take over computer processing tasks when a high speed malfunction occurs.

In order to achieve the above object, this invention for instance is comprised of a multi-computer system comprising a first computer, a second computer and a common external memory device for use by both said first computer and said second computer and when a malfunction occurs in the computer set in the main system, the processing performed by said computer is carried out by the computer installed in the backup system and the operating method for said multi-computer system is characterized in that; in the first computer installed in the main system, an operating system incorporating the file system from the common disk unit and an application for job task processing utilizing said external memory device are executed and the second computer installed in the backup system runs the operating system incorporating the file system of said common disk unit and the program for monitoring the status of the first computer and at the same time an application is loaded for performing job task processing while utilizing said common external memory device and this status is maintained;

when the control program of the second computer detects a malfunction in the first computer, a specified process in said control program, resets the first computer, setting the first computer as the backup computer, and the second computer as the main computer, whereupon the second computer then starts up and runs said application.

In an operating method of this type, an expensive transmission path such as using optical fibers is not required and further, the backup computer is not started up after the malfunction has occurred, and the multi-computer system of this method can hand over processing to the backup system at high speed utilizing the common disk unit.

The multi-computer system of this invention also has the object of processing according to the status of the malfunction when an error or malfunction occurs in the computer.

In order to achieve the above object, this invention for instance is comprised of a multi-computer system comprising a plurality of computers, a common external disk unit shared by said plurality of computers, and when a malfunction occurs in the main computer installed in the main system, the processing performed by the main computer is carried out by the backup computer installed in the backup system and said multi-computer system is characterized in that;

each computer operates autonomously versus process of a said computer and are equipped with function expansion board connected alternately by way of the transmission paths, and said function expansion boards have;

a reset request means for selectively sending either a single reset request or a continuous reset request by way of said transmission path to the function expansion board installed in the computer other than the computer where the malfunction occurred and, a reset means to instantaneously reset or cancel reset of the computer equipped with said function expansion boards when a single reset request is received by way of said transmission path from the function expansion board installed in another computer; and to perform continual reset when a continuous reset request is received by way of said transmission path from the function expansion board installed in another computer.

In a multi-computer system of this type therefore, a single reset request is issued versus one malfunction in a computer, and continual reset performed versus permanent types of malfunctions. In this way, reset can be performed according to the extent of the problem that has occurred.

A yet further object of the invention is to assist in replacement of the common disk unit when a malfunction occurs in the computer.

In order to achieve the above object, this invention for instance is comprised of a multi-computer system comprising a plurality of computers, a common external disk unit shared by said plurality of computers, and when a malfunction occurs in the main computer installed in the main system, the processing performed by the main computer is carried out by the backup computer installed in the backup system and said multi-computer system is characterized by;

a report means for monitoring the status of the common disk unit and reporting the status of the common disk unit being monitored to said computer, a cancelling means for cancelling the electrical connections between the common disk unit and said computer in response to a command received from a computer.

In this kind of multi-computer system, when a malfunction occurs in the common disk unit, the common disk can be replaced without having to stop the entire system in a state where the common disk unit is electrically independent of the system.

BRIEF DESCRIPTION OF THE DRAWINGS

FIG. 5 is a drawing showing the message storage memory contents.

FIG. 6 is a table showing the switching pattern of the MOS switch inside the common disk unit.

FIG. 15 is a table showing a list of messages transmitted by way of the high reliability control network.

DETAILED DESCRIPTION OF THE PREFERRED EMBODIMENTS

Figure 1:
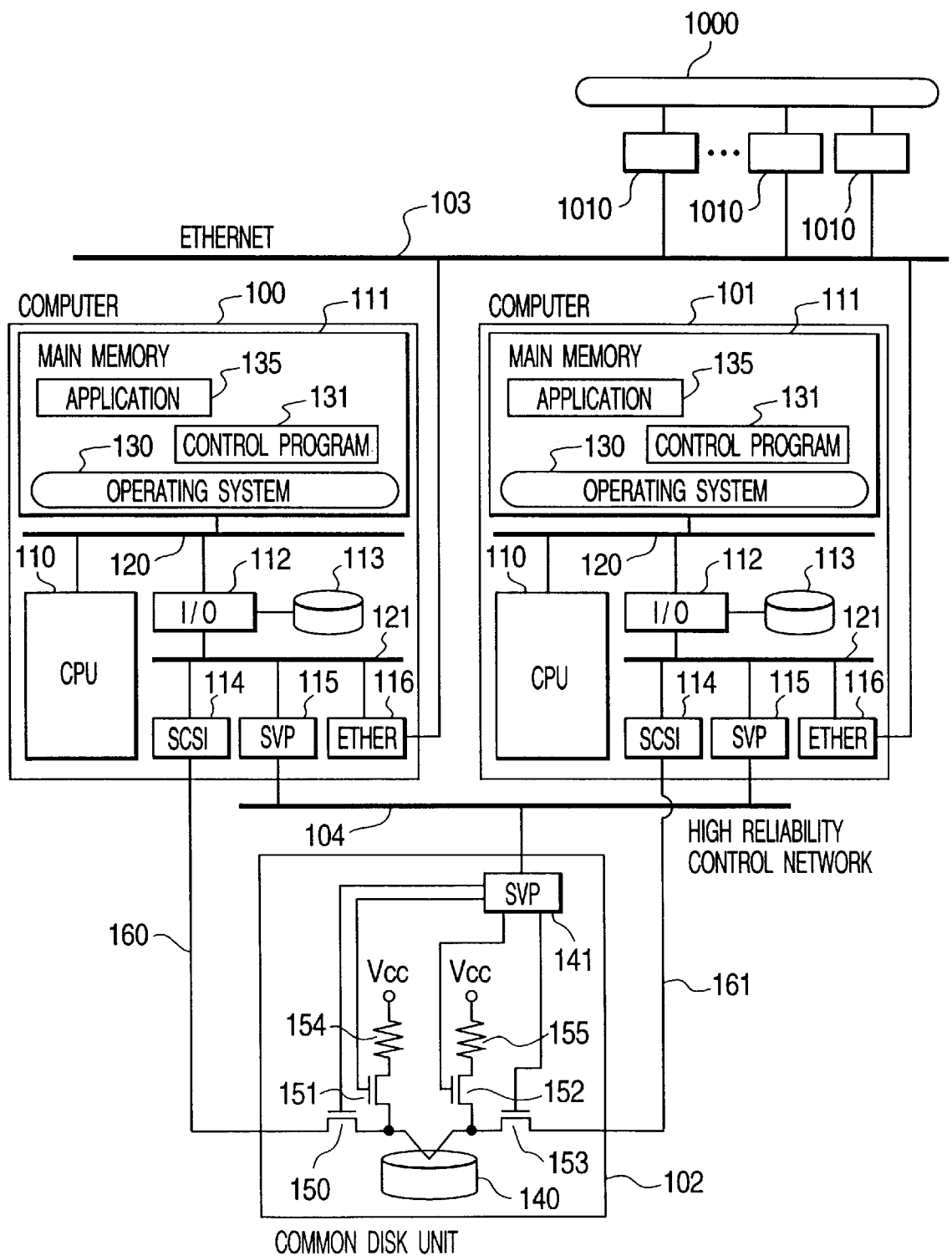
FIG. 1 is a block diagram showing the structure of the redundant type system of the embodiment of this invention.

An embodiment of a multi-computer system of this inventions is explained next while referring to the drawings.

FIG. 1 is a block diagram showing the structure of the redundant type system of the embodiment of this invention.

As shown in the figure, the multi-computer system of this embodiment has two computers connected to one common disk unit. However such a system may also utilize three or more computers.

In FIG. 1, the reference numerals 101 and 101 respectively denote the main computer and the backup computer. The backup computer may however function as the main computer and the main computer may function as the backup computer.

The computers 100 and 101 are equipped with a central processing unit (CPU) 110, a main storage unit 111, and an input output device (I/O) 112, all connected to the CPU bus 120.

The input output device (I/O) 112 usually connects to a disk unit 113 and expansion board bus 121.

The expansion board bus 121 connects to a slot for connecting the expansion board utilized for expansion of the computer functions. In this embodiment, the computers 100 and 101 are provided with an SCSI board 114 (Small Computer System Interface), an Ethernet board 116, and an SVP (Supervise Processor) board as the expansion boards.

The Ethernet boards in the computers 100 and 101 are connected to an Ethernet 103 and connect via a network for communication with other computers, etc. In this embodiment, the Ethernet 103 controls a plant 1000 and is connected to a plurality of controllers 1010.

Also, the SCSI boards 114 of the computers 100 and 101 connect to the common disk unit 102 by way of the SCSI cables 160 and 161.

The SVP boards 115 in the computers 100 and 101 are connected to a high reliability control network 104. The SVP boards 104 for the computers 100 and 101 generally have the following functions.

Firstly, storing of the computer operating status. More specifically, storing of data relating to the computer error status such as internal temperature, fan operation and stoppage, and history of memory parity errors.

Secondly, the transfer of messages to separate SVP boards by way of the high reliability control network in accordance with requests from the control program.

Finally, performing the following processes according to their type, when messages are brought from other SVP boards.

(1) The output of a one-time reset signal to the computer that is connected, upon receiving a single reset command message.

(2) The continual output of a reset signal to the computer that is connected upon receiving a continuous reset command signal.

(3) The issuing of a report on the stored computer status to the SVP board making the request upon receiving a status request command.

(4) The reporting of a message as it is, to the control program when a message other than the above is received.

Inside the common disk unit 102, a disk drive unit 140 perform input and output of data in compliance with the SCSI standard used as the recording medium of the common disk unit 102. The SVP board 141 is the same in each computer. Inside the common disk unit 102, the MOS switches 150 through 153 and the terminator resistors 154 and 155 are provided.

The SVP boards 141 for the common disk unit 102 generally have the following functions.

Firstly, when an error or malfunction occurs in the disk unit such as a temperature malfunction inside the disk unit or a fan stoppage, this error is reported to the SVP board in the computer.

Secondly, when a disk switching command is received from the computer SVP board, the MOS switches inside the disk unit are set on or off in accordance with the specified switching pattern.

In a redundant system of this type, when the main computer 100 and the backup computer 101 are functioning correctly, the OS 130, the application 135 and the control program 131 are loaded into the main storage unit 111 of the main computer 100 and said programs and applications then run.

In the backup computer 101 on the other hand, OS 130 such as WindowsNT, Windows95 or MS-DOS and the control program 131 are loaded into the main storage unit 111 and run. Also in the backup computer 101, the application 135 is loaded into the main storage unit 111 but is not run.

The application 135 and the control program 131 are run on OS130 in the computers 100 and 101.

The application 135 is a program designed to perform processing in the redundant system. For instance, perform processing and recording of data sent from the controllers 1010 by way of the Ethernet 103.

The control program is used for changing between main and backup computers in the redundant system by cooperating with SVP 115.

Here, the OS130 for the main computer 100 and the backup computer 101, starts up when the MOS switches 150 and 153 are turned on and the MOS switches 151 and 152 are turned off. The OS130 of either computer is set to recognize the common disk unit 102 as part of the file system. The SCSI used here is a bus type interface and terminator resistors must be installed at both ends of this bus. In the current status with the MOS switches 150 and 153 turned on and the MOS switches 151 and 152 turned off, the terminator resistor inside the SCSI board 114 in the main computer, and the terminator resistor inside the SCSI board 114 in the backup computer function to terminate the SCSI bus at both ends, and the terminator resistors 154 and 155 inside the common disk unit are isolated from the SCSI bus.

Hereafter, each section will be explained in detail.

Figure 2:
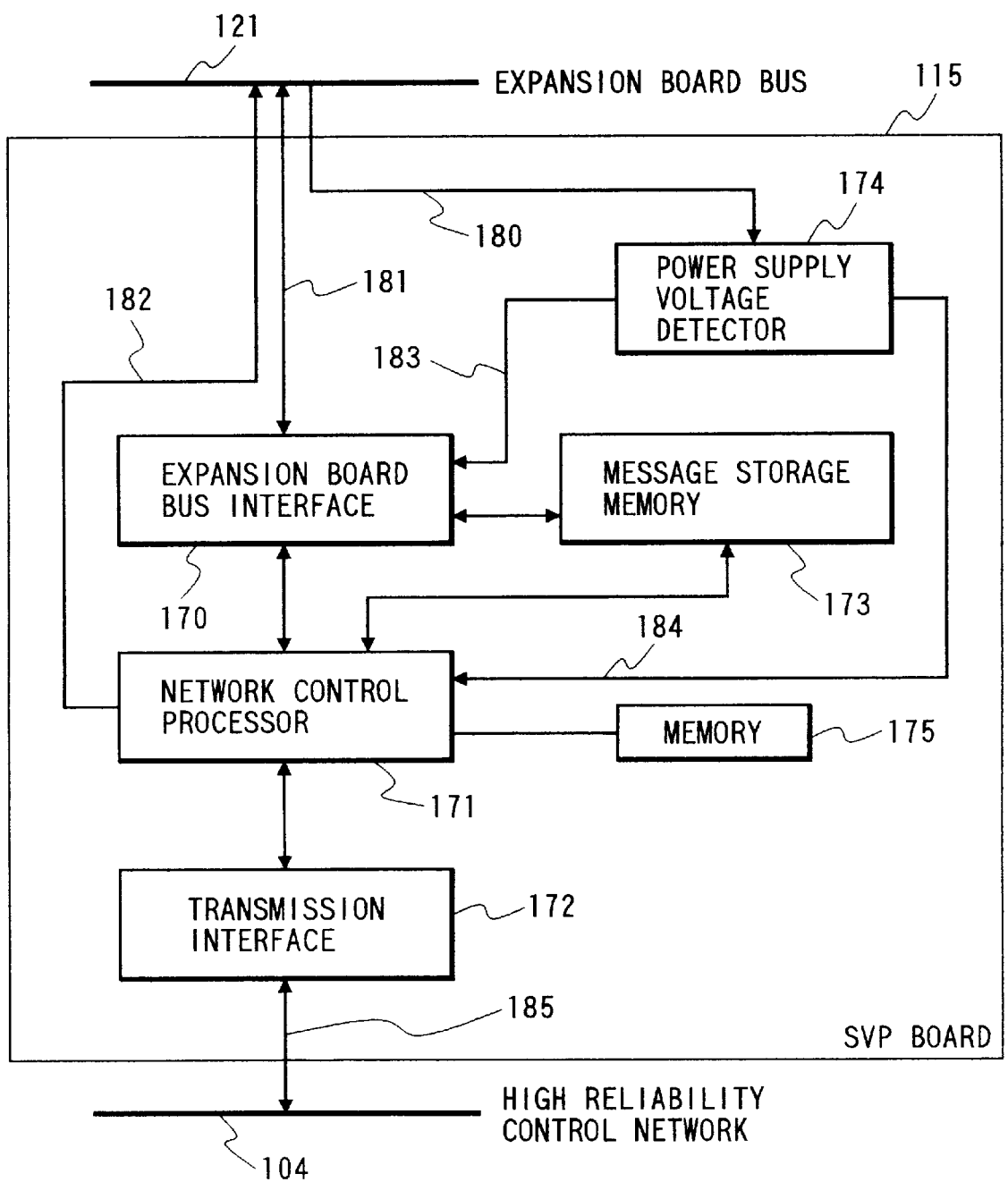
FIG. 2 is a block diagram showing the configuration of the SVP board installed in the computer.

FIG. 2 shows the internal configuration of the SVP board 115 of the computers 100 and 101.

As shown in the figure, the SVP board 115 is comprised of; an expansion path interface 170 for handling inputs and outputs with the CPU path, a network control processor 171 for processing messages by way of the high reliability control network 104, a memory 175 for storing the program run by the network control processor 171, a transmission interface 172 for conversion of messages and electrical signals of the network, a message storage memory 173 functioning as a temporary storage buffer of messages and information on status, a power supply voltage detector 174 for detecting the power supply start-up and issuing an SVP board reset signal.

Further, the SVP board operations can be broadly classified into resetting, monitoring computer status, sending control messages, and receiving control messages. Each of these operations will be explained next.

In the reset operation, the SVP board 115 functions independently of the various computers to which it is connected and even when the computer is reset due to a malfunction, that malfunction status must be stored in the memory. Accordingly the resetting of the SVP board 115 itself, is performed separately from the resetting of the computer. The SVP board therefore is provided with a power supply voltage detector 174 for monitoring the power supply voltage supplied by way of the slot of the expansion board bus 121. This power supply voltage detector 174 detects the rise or start-up of the power supply voltage and then outputs a reset signal from the signal lines 183 and 184 to show the result. These signal lines 183 and 184 issue an output to expansion board bus interface and the network control processor 171, in each section, clearing the memories to zero, clearing the status information and resetting the networks.

Next, in the computer monitoring operation, the SVP board has the role of storing the computer status information, monitoring computer power supply errors, fan operation/stoppages and temperature errors by way of the signal line 181 and storing the results in the message storage memory 173. In this embodiment, the computers 100 and 101 themselves are provided with a function to detect abnormalities such as computer power supply errors, fan operation/stoppages and temperature errors. The detection results are reported to the SVP board 115 by way of the slot for the expansion bus 121.

The operation for sending control messages will next be described. The control program 131 issues a message transmit request to the expansion board bus interface 170 by way of the expansion board bus 121. The expansion board bus interface 170 temporarily stores the message to be sent, in the message storage memory 173. Afterwards, the expansion board bus interface 170 informs the network control processor 171 that a message has arrived. The network control processor 171 which was informed of the message, extracts the message to be transmitted from the message storage memory 173, transfers the message to the transmission interface 172 and transmits the message to the other SVP boards on the high reliability control network 104 by way of the high reliability control network.

Here, the reason for temporarily copying the data in the message storage memory 173 is that the data transfer speeds of the high reliability control network and the expansion board bus are frequently different, so the message storage memory 173 is used as a buffer to handle the different transfer speeds.

Finally, the operation for receiving control messages will next be described. Control messages sent to the transmission interface 172 from the high reliability control network by way of the signal line 185 are received by the network control processor 171.

The network control processor 171 performs processing as follows, according to the type of message that is received.

Firstly, if the message is an automatic reset command, the network control processor 171 sends a reset signal to reset the computer, by way of the reset signal line 182.

Secondly, if the message is a status check command, the network control processor 171 extracts the computer status information stored in the message storage memory 173 and sends this information as a status report command to the SVP board that originally issued the status check command.

Finally, if control messages other than those above are received (control messages requiring processing by the control program in the computer), such messages are stored in the message storage memory 173. These messages stored in the message storage memory 173 are afterwards read-out at any time by way of the signal line 181 at the request from the control program 131 of the computer.

Hereafter, a detailed explanation will be given of the processing by the expansion board bus interface 170 as well as the network processor 171 in order to obtain the following operations.

Figure 3:
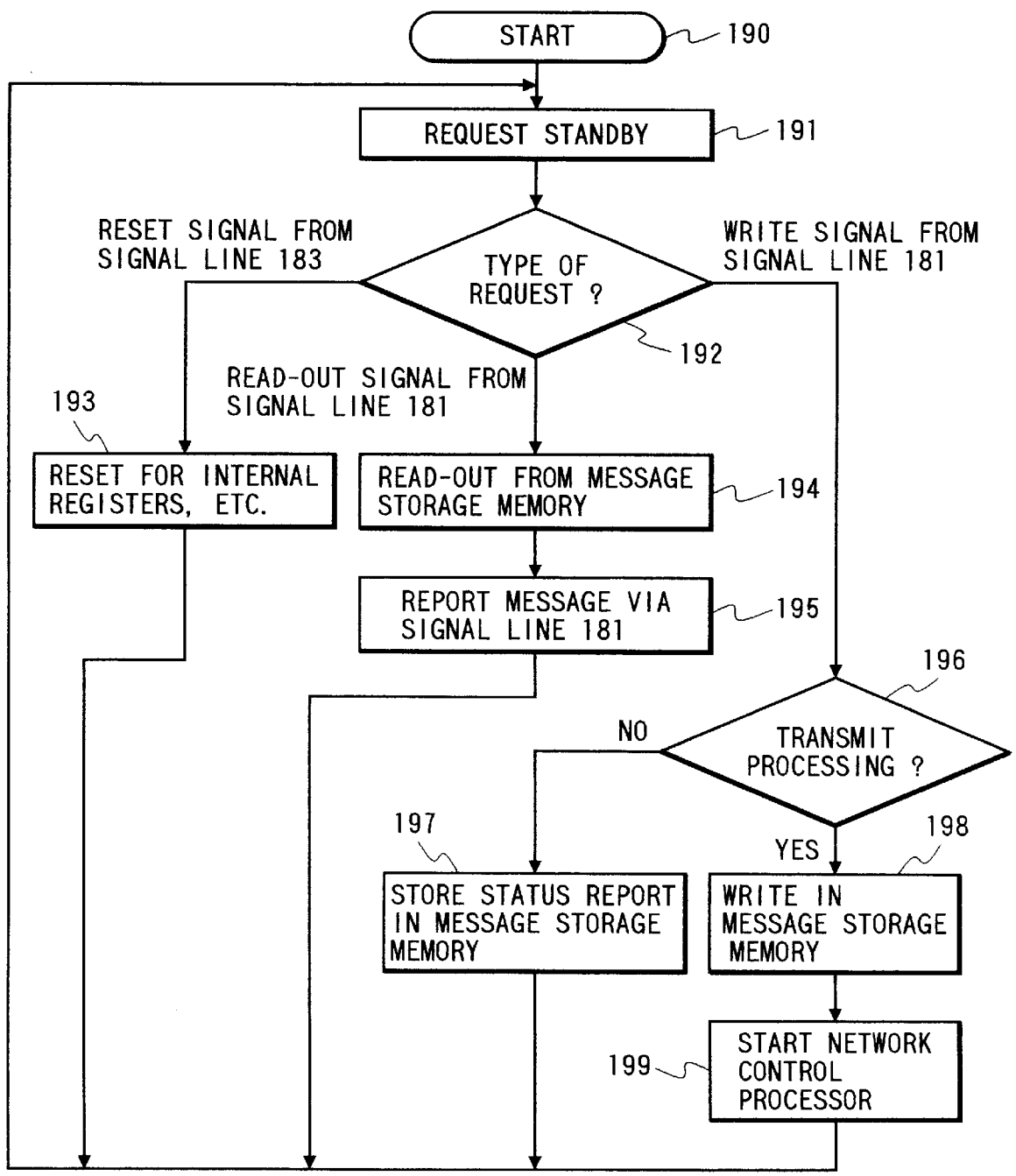
FIG. 3 is a flowchart showing the processing sequence for the expansion board interface.

The processing sequence performed by the expansion board bus interface 170 is shown in FIG. 3. The expansion board bus interface 170 starts processing upon receiving an input/output request from the computer (expansion board bus). In other words, the request standby (status) 191 is cancelled upon receiving one of three types of signals; a reset signal from signal line 183, a read-out signal or a write signal from signal line 181.

When the above signals are received, a type of request 192 determines the type of request and upon determining that the request is a reset signal at power supply rise (start-up), performs reset of the internal registers and circuits (process 193).

When the signal is a read-out signal from the signal line 181, control messages arriving from the other SVP boards must be reported to the computer control program 131. Accordingly, the control messages stored in the message storage memory are extracted (process 194) and sent to the expansion board bus 121 by way of the signal line 181.

When the signal is a write signal from the signal line 181, this write signal is identified as a computer status report (power supply error, fan operate/stoppage, etc.) or a control message transmission (process 196). If determined to be a computer status report, said status is stored in the message storage memory (process 197). If determined to be a control message transmission, said control message is temporarily stored in the message storage memory (process 198) and sent to the network control processor 170 (process 199).

Figure 4:
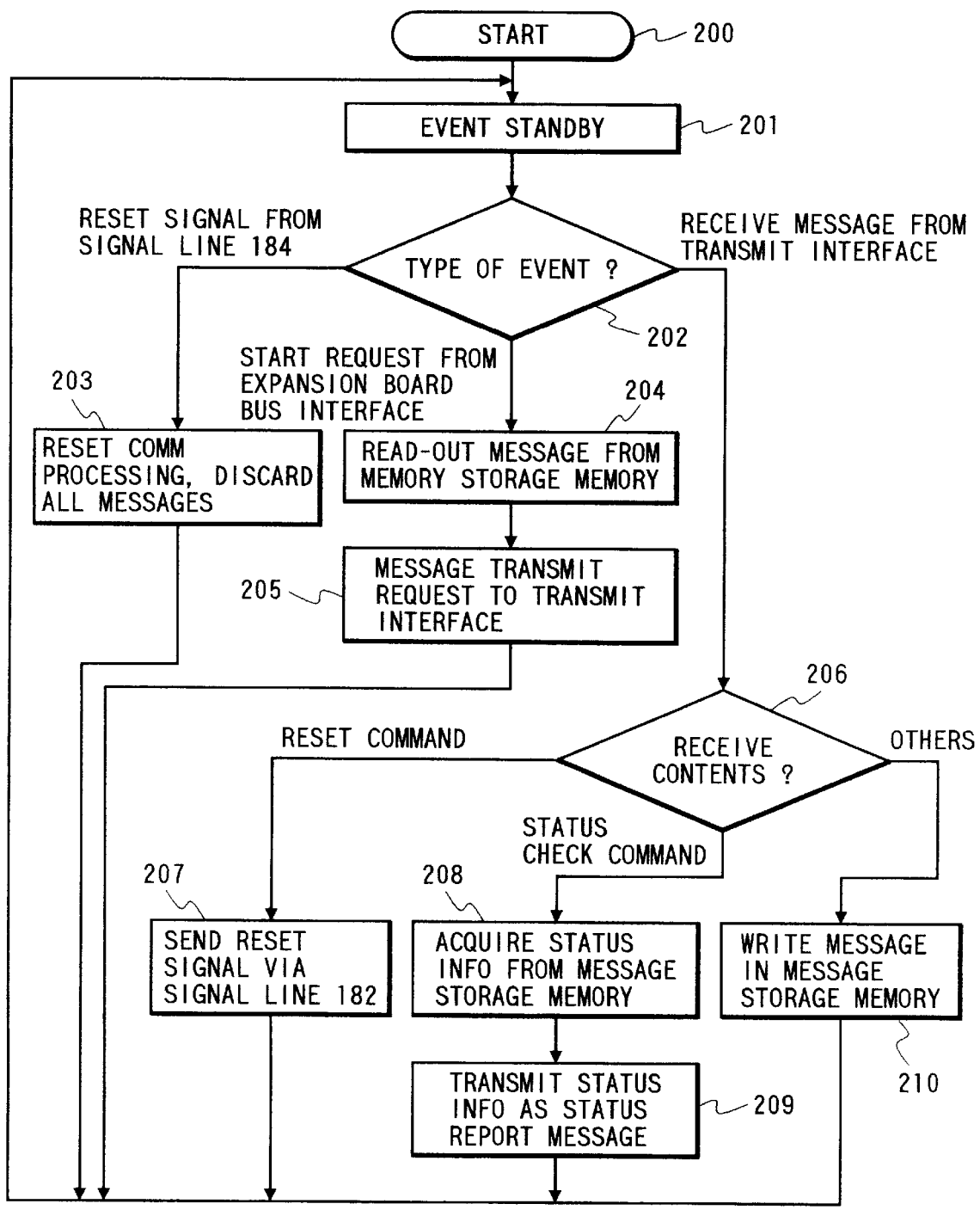
FIG. 4 is a flowchart showing the processing sequence of the network control processor of the SVP board installed in the computer.

Next, the processing sequence performed by the network control processor 171 is shown in FIG. 4. In the operation of the network control processor shown in the figure, the event standby status (process 201) is cancelled and operation proceeds to the next process, when a reset signal, a start request from the expansion board path interface, or any message from the transmission interface is received due to the occurrence of an event. In other words, when any of the events occurs in the event standby 201, the type of event is identified in the process 202. Just as with the expansion board path interface, when a reset signal during power supply start-up is applied, the communication process is reset and all arriving messages are discarded (process 203).

When an event occurs however, if a start request from the expansion board path interface, in other words, a control message transmit request is present, then the control message to be transmit is read-out from the message storage memory (process 204) and the control message is sent to the transmit interface (process 205).

Also, the occurrence of a message receive event from the transmission interface indicates that control messages from other SVP boards have arrived. In such cases, the type of processing then performed, differs according to the type of control message.

In other words, process 206 determines the type of control message and if found to be an automatic reset command, a reset signal is sent to the computer by way of signal line 182 (process 207). This automatic reset command may consist of one of two types; a single reset command or a continuous reset command. Upon receiving a single reset command, a reset signal (reset pulse) is sent one time to the computer. Single reset is performed by momentarily setting the reset line of the expansion board path 121 to low level.

Upon receiving a continuous reset command however, a reset signal is continuously sent to the computer. This continuous reset is achieved by keeping the reset line of the expansion board path 121 at a low level. A computer tied to an SVP board that received a continuous reset command can thus maintain a reset state (status right after start-up) and in effect isolate that computer from the system. In such a case, independent processing on the SVP board can continue in this state. In some computers, reset may be achieved by setting the reset line to a high level.

When the control message that is received is a status check command, computer status information is procured from the message storage memory (process 208) and sent as the status report message, to the SVP board that originated the control message (process 209).

When the control message must be handled by means of the control program, the received message is simply store in the message storage memory 173 (process 210).

The configuration of the message storage memory 173 is shown in FIG. 5. Status information for the transmit message, receive messages and also the computer are stored as data in the message storage memory 173 as shown in the figure.

More specifically, a transmit message standby pulse train 220, a receive message standby pulse train 221 and a computer status table 222 are provided inside the message storage memory 173. The transmit and receive message pulse trains are each stored in an FIFO (First-In First-Out) system as control messages for transmit and control messages for receive. The computer status, for instance, power supply abnormalities, fan operation/stoppages, temperature malfunctions and battery errors are stored inside the computer status table 222. The SVP boards installed in the computers 100 and 101 have now been described.

Next, the SVP 141 boards installed in the common disk unit 102 will be described.

As related previously, the common disk unit 102 is connected to both computers 100 and 101 when the main computer 100 and the backup computer 101 are functioning correctly.

In view of the goal of high reliability in this redundant system, not only must the backup (or slave) computer 101 take over the role of main computer when the (previously) main computer 100 is damaged or stopped but also support must given to removing the malfunctioning computer 100 from the system and connecting the new computer to the system (reforming the redundant system). Preferably the backup computer 101 which is functioning correctly is not stopped at this time.

The MOS switches 150 to 153 and the terminating resistors 154, 155 are provided inside the common disk unit and when either one of the computers is removed from the system, the MOS switches function to provide a terminated load for the SCSI device.

Here, the switching pattern of the MOS switches 150 to 153 is shown in FIG. 6. As related previously, when both computers are functioning correctly, the MOS switches 150, 153 shown in "a" are both on. When these MOS switches 150, 153 are on, the computers 100 and 101 are each connected to the disk drive 140 by way of the SCSI cable 160 and 161. At the same time, by setting the MOS switches 151 and 152 off, the electrical connection between the disk drive 140 and the terminator resistors 154, 155 is eliminated so that the connection with the three SCSI devices; the SCSI board of computer 100, the disk drive 140 and the SCSI board of computer 101 are terminated at both ends of the device.

Figure 7:
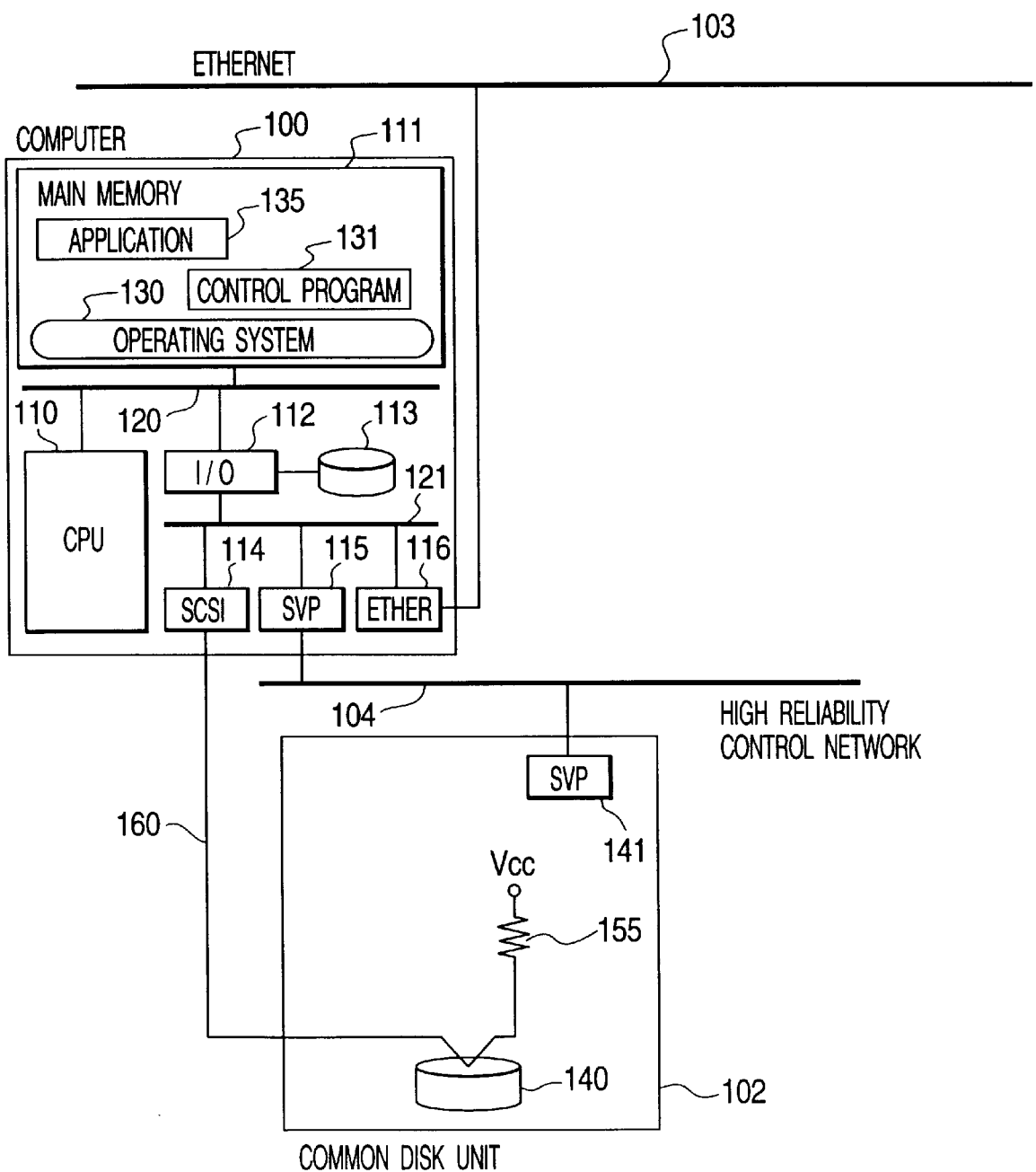
FIG. 7 is a drawing showing the configuration of a system where one computer has malfunctioned and a functioning computer system.

Here, when the computer 101 has malfunctioned, in order to restore operation, the backup computer 101 is isolated from system and when attempting to connect another computer, the terminated SCSI board itself is isolated from the computer 101. At this point, prior to the removal of the computer 101, as shown in FIG. 6c, the MOS switches 150 and 152 are now turned on, and the MOS switches 151 and 153 now turned off. This process changes the circuit shown in FIG. 1 to a circuit equivalent to that of FIG. 7. Namely, the SCSI boards 114 and the SCSI interface drive 140 connected by the SCSI cable 160 are each terminated at both ends of the devices and the SCSI disk drive 140 can be referred to find if the computer 100 is operating correctly. Conversely, when the computer 100 has malfunctioned, the MOS switches 151 and 153 turn on as shown in FIG. 6b and the MOS switches 150 and 152 turn off. This action allows referring to the disk drive 140 to determine if the computer 101 is operating correctly.

When the common disk unit 102 itself has malfunctioned, the MOS switches 150 through 153 all turn off as shown in FIG. 6d and then if the common disk unit 102 has been isolated from the system, the disk drive can be replaced while isolated from electrical signals in the system.

The above described functions are utilized in the SVP board 141 installed in the common disk unit 102 as explained in detail as follows.

Figure 8:
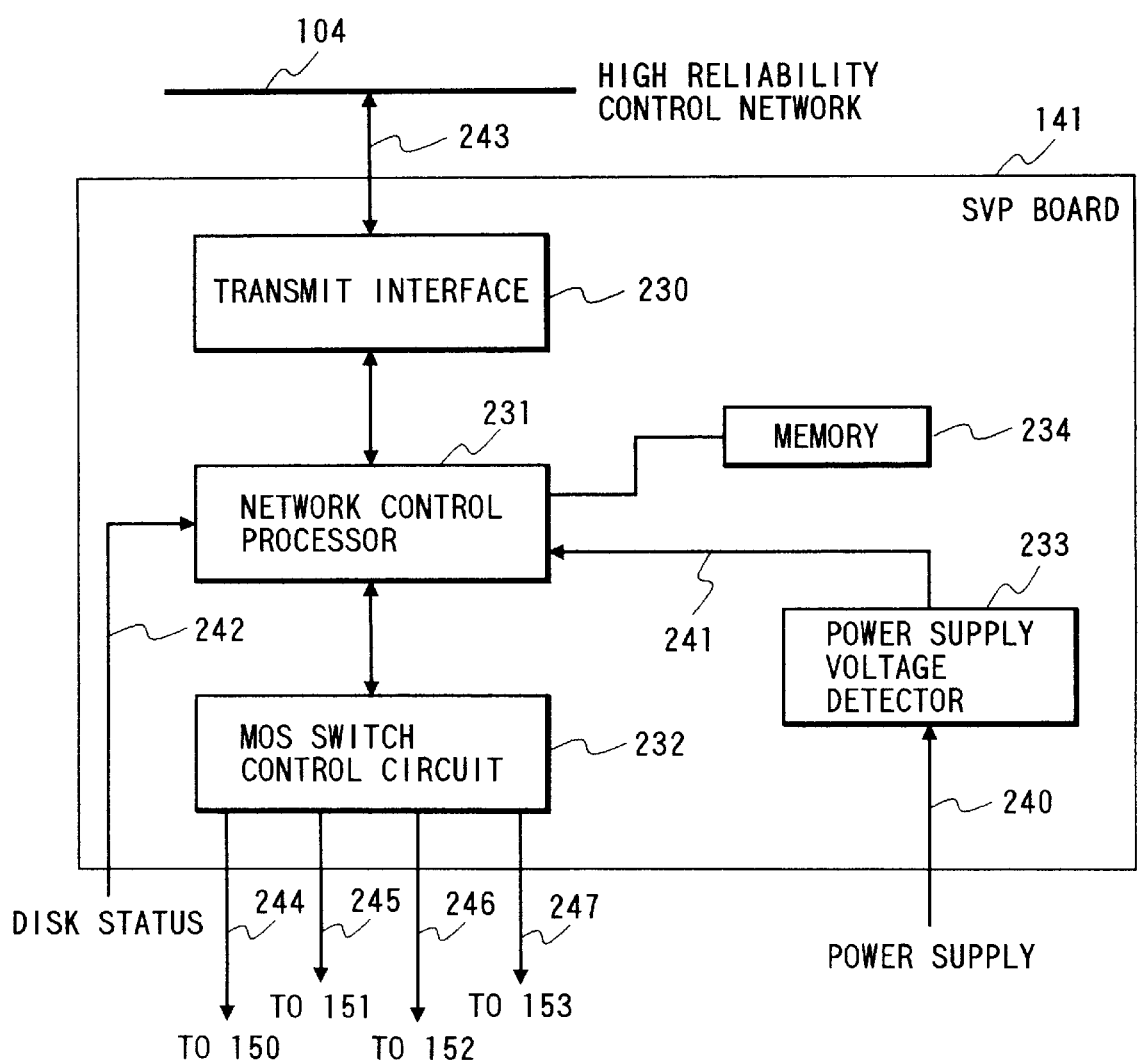
FIG. 8 is a block diagram showing the configuration of the SVP board installed in the common disk system.

The configuration of the SVP board 141 installed in the common disk unit 102 is shown in FIG. 8. The SVP board 141 is connected to the high reliability control network 104 and mutually exchanges messages with the computer SVP boards. The transmit interface 230 converts the network electrical signals 243 into control messages and sends these control messages to the network control processor 231. Further, the control messages sent from the network control processor 231 are converted into electrical signals and transmitted by way of the high reliability control network.

Here, as shown in the figure, the SVP board 141 unlike the SVP board 115 connected to the computer, has no message storage memory. The reason for this is because the common disk unit does not consecutively send and receive control messages within a short time.

Restated, the control messages processed by the network control processor 231 are basically of the following two types. One type is a disk status report message (transmit) in which when the signal line 24 reports a change in disk status, this change is reported as a control message to the SVP board 115 of the computer.

The other type is a disk switching message (receive) in which the SVP board 115 of the computer sends a control message to turn the MOS switches 150 through 153 inside the disk unit on or off. When this control message is received, the MOS switching control circuit 232 is requested to change the MOS switches 150 through 153 according to the pattern (any pattern from FIG. 6) specified by the control message. The MOS switching control circuit 232 then sets the outputs for the signal lines 244 through 247 connected to the gates of each MOS switch according to the requested switching pattern.

The SVP board 114 also has a power supply voltage detector 233 just the same as the SVP board 115 connected to the computer. This power supply voltage detector 233 detects the voltage 240 supplied to the disk unit and issues a reset signal 241. This reset signal initializes or resets the network control processor 231.

The transmission interface 230 utilized by this SVP board 141 may be the same as the transmission interface 172 inside the SVP board 115 connected to the computer. Further, the network control processor 231 may also be the same as the network control processor 171 of the SVP board 115 connected to the computer however, since the control messages to be processed are different, even if a processor that is physically identical is utilized, the program stored in the memory 234 for running the network control processor 231 will be different.

Figure 9:
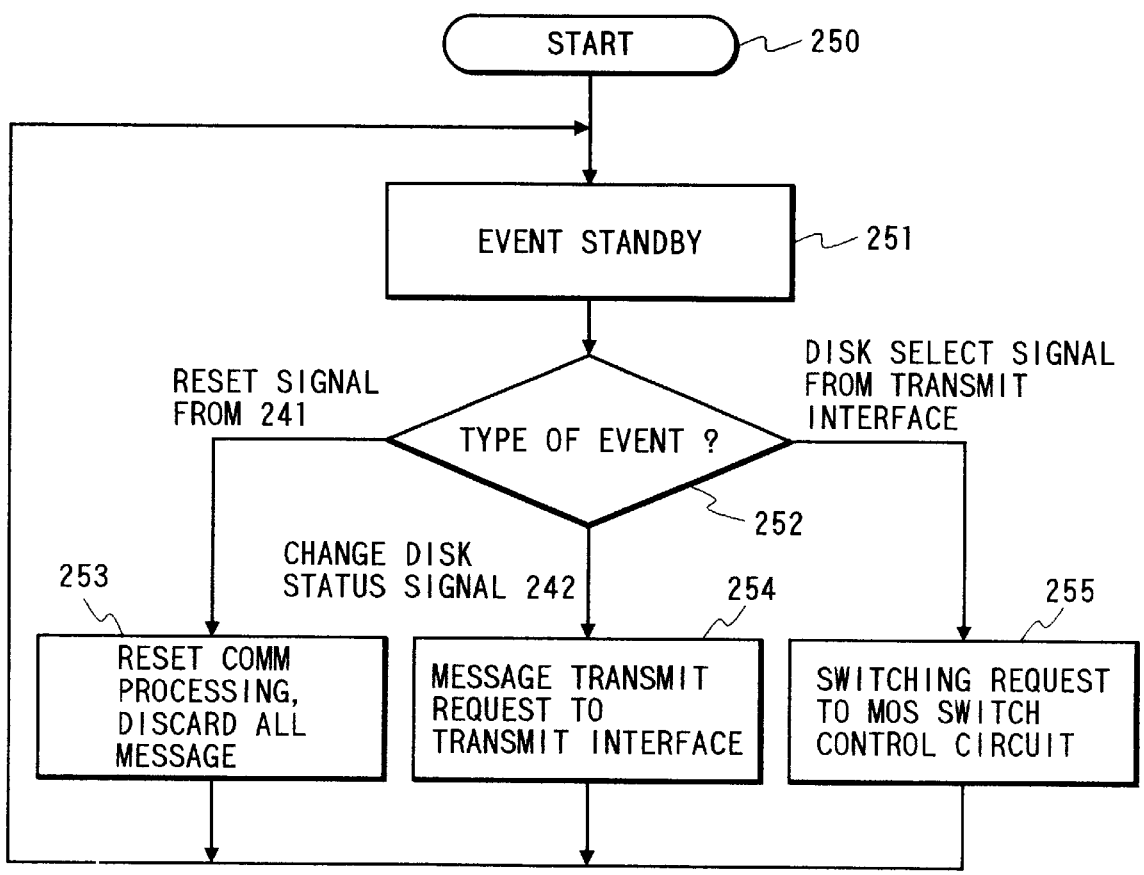
FIG. 9 is a flowchart showing the processing sequence of the network control processor of the SVP board installed in the common disk system.

FIG. 9 shows the processing sequence of the network processor 231 on the SVP board 141 in the common disk unit 102.

Among events where the network control processor 231 proceeds from event standby status 251 to the next operation, are the receiving of a reset signal from the signal line 241, a status change in the disk status signal 242, or receipt of a disk selection command message from the transmit interface 230. When any of these events occur, the type of event is identified in process 252.

The identified event is an event in which the power supply voltage detector detects a power supply rise (start-up) and a reset signal is sent, tasks such as resetting of the communications and discarding of previously received messages is performed and the SVP board status is reset (process 253).

The type of event is conveyed as a change of the signal line 242. When a change in status inside the disk unit occurs such as for instance, a power supply malfunction in the disk unit, fan operation/stoppage, temperature malfunction or disk driver hardware error, then the network control processor 231 identifies the contents of the status change indicated by the event and reports the contents thus identified, as a disk status change, to the SVP board 115 of the computer (process 254). However, in this embodiment, the disk drive 140 itself incorporates a function to identify to detect problems such as power supply malfunctions, fan operation/stoppage, or temperature malfunctions in the common disk unit 102 and the detection results are reported to the SVP board 141 by way of the signal line 242.

When the event that occurred is received as a disk switching command message transmitted from the computer SVP board, the MOS switch control circuit 232 is requested (process 255) to control the ON/OFF switching of the MOS switch in compliance with the pattern (FIGS. 6a–d) specified by the disk switching command message.

Next, the control program 131 for performing switching of the main computer and backup computer by utilizing the SVP boards 115 and 141 is described.

The main tasks performed by the control program 131 consists of the following three types.

In the first type, a (check-in) report signal is sent periodically by way of the SVP board to report that the computer is functioning correctly.

In the second type, control messages are periodically received from the SVP board 115 and processing performed. For instance, if said control message is a (check-in) report signal, the presence of the computer from which the control message originated is acknowledged. Also for instance, if the message is a disk status report message, then the required disk switching command is sent to the common disk unit 102 by way of the SVP board 115.

In the third type, if a (check-in) report signal is not received from the other computer within a specified time, then that computer is determined to have malfunctioned and is automatically reset and disk switching performed. If this other malfunctioning computer is the main computer, then the main operation is shifted to the backup computer. Further, when switching to the backup computer for main operation, then the data read-out in the main storage unit 111 from the common disk unit 102 is nullified in order to maintain the consistency of the data.

Figure 10:
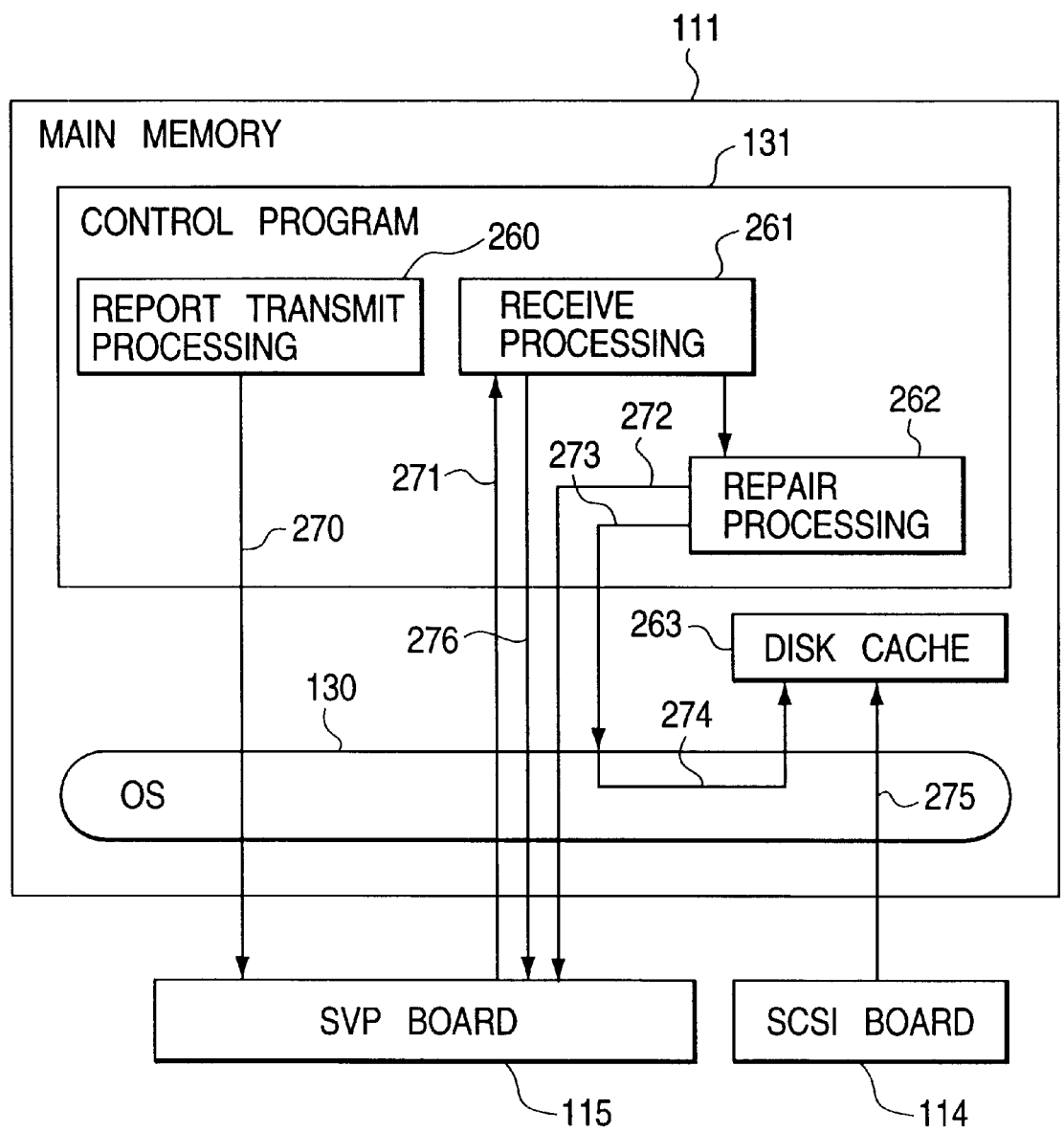
FIG. 10 is a drawing showing the internal configuration of the control program.

Hereafter, the control program is explained in detail. The internal structure of the control program 131 is shown in FIG. 10. The control program 131 is comprised of three tasks 260 through 262 corresponding to three types of tasks just described.

The role of the (check-in) report transmit task 260 is to report that this computer itself is functioning correctly by way of the SVP board 115 to the other computer. Therefore transmission of a (check-in) report message 270 is requested from the SVP board at fixed intervals. The receive processing task 261 has the job or receiving (check-in) report signals transmitted by the SVP 115 boards in the other computer, as well as receiving disk status report messages 271 transmitted by the SVP board 141 of the common disk unit 102. The receive processing task 261 just as with the (check-in) report transmit processing task 260, is started up at fixed intervals and extracts control messages stored in the message storage memory 173 inside the SVP board 115.

When a (check-in) report message has not arrived from the other computer after a specified amount of time has elapsed, the receive processing task 261 determines that the other computer has malfunctioned and requests automatic reset of the computer as well as disk switching of the repair processing task 262. Also when a disk status report message is received, an error in the common disk unit 102 has occurred (or reset after a malfunction) so a disk switching command 276 is issued and the on/off status of the MOS switches changed inside the disk unit.

The operation of the repair processing task 262 is described next.

First, when an automatic reset command is sent (process 273) in response to a malfunctioning computer; a computer status check is sent if needed in order to check the computer and acquire the computer breakdown status. At this point, if the malfunction is determined to be in one location such as due to a parity error, then a single reset command is selected. If the malfunction is found to be serious or is in one location but keeps occurring, then a continuous reset command is selected as an automatic reset command.

Second, when an automatic reset command is sent as a continuous reset command; with the isolation of the malfunctioning computer from the system as a precondition, a disk switching message is then sent. This disk switching message specifies a disk switching pattern so that the computer itself and the common disk unit 102 are mutually terminated at both ends of the SCSI connection. There is therefore no effect sustained, even with the isolation of the malfunctioning computer from the system and the functioning computer can refer to the common disk unit as needed.

Third, the major part of OS130 is provided by 275 for the contents of the disk unit 102 copied into the disk cache 263 of the main storage unit 111 for improving processing efficiency by having normal disk referencing performed in the disk cache 263. The repair processing task 262 disables the disk cache 263 immediately prior to shifting main operation from the main computer that has malfunctioned, to the backup computer. The disk cache 263 is usually controlled by the OS130, so a processing request 273 via OS130 is made and the disk cache 263 then disabled.

Figure 11:
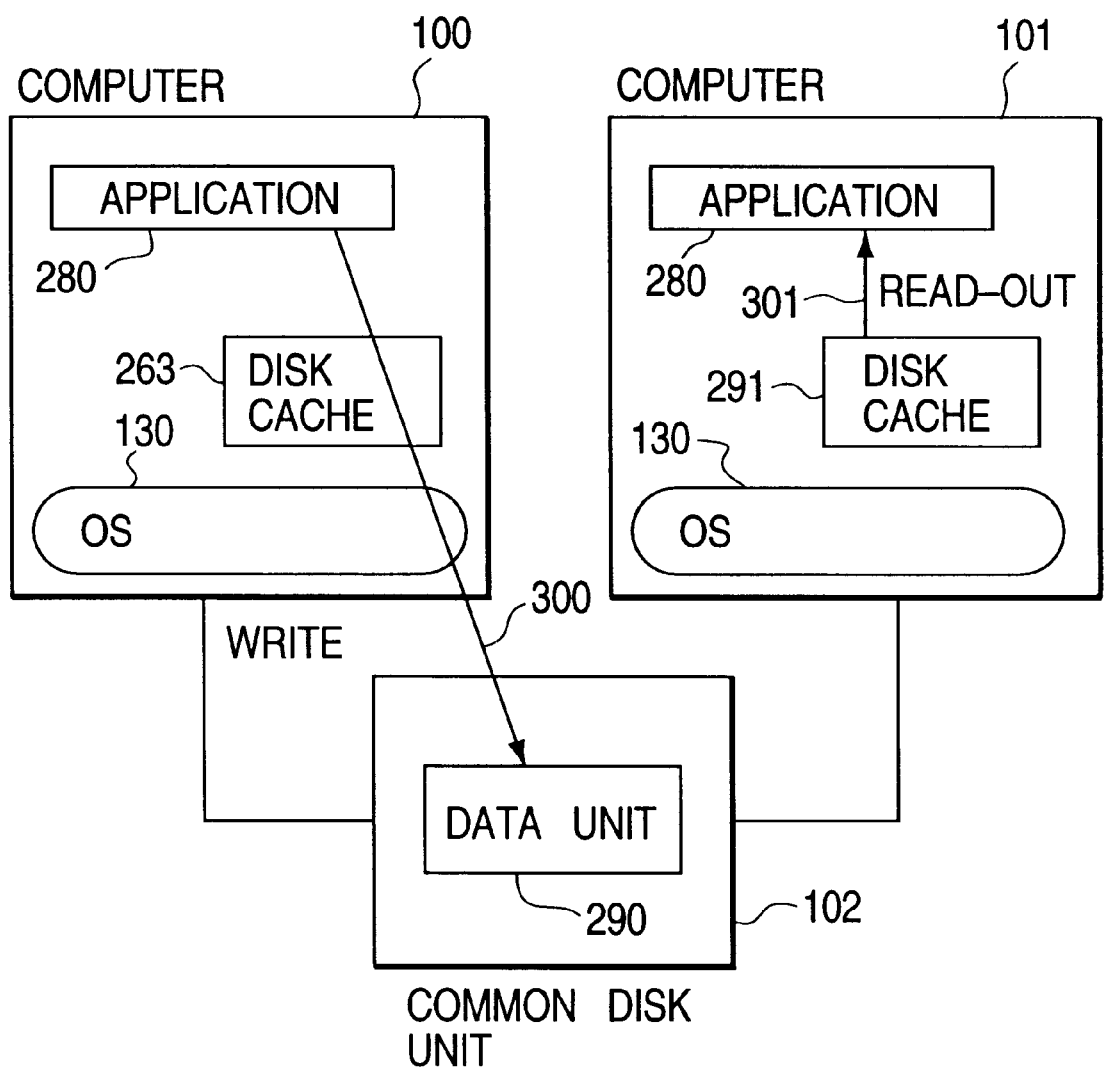
FIG. 11 is a drawing showing an example of disk cache operation.

The reason for the processing in the above third step is that the contents of the common disk unit 102 are also copied as a disk cache in the main storage device of the computers connected to the common disk unit 102. Consequently, if the contents of the common disk unit in the main computer are changed, and if the corresponding data is also possessed in the disk cache 263 in the backup computer, then when the main operation is shifted to the backup computer, the changed data contents of the common disk unit 102 will unfortunately, not be referred to or used and the unchanged data in the disk cache (copy) will be used instead. For instance as shown in FIG. 11, in the system comprising the computers 100, 101 and the common disk unit 102, the computer 100 is the main computer and the computer 101 is the backup computer. For a data unit 290 in the common disk unit 102, with the disk cache 263 present in the main computer and the disk cache 291 being present in the backup computer. Here, the application 280 is performing processing during operation of the main computer 100 and the data 290 in the common disk unit 102 is rewritten (300). At this point, the computer 100 malfunctions and the computer 101 now becomes the main computer. The previous data corresponding to the data 290 of the common disk unit 102 is present in the disk cache 291 of the computer 101 so this corresponding data is referred (301) to as needed. However, in cases where the data rewritten in the process 300 does not appear in the disk cache 291, then the data referred to in the process 301 will be old and incorrect.

In order therefore, to prevent this incorrect data from being referred to, the backup computer renders the contents of the disk cache invalid, prior to taking over the processing from the malfunctioning main computer.

Hereafter, the processing for the (check-in) report transmit task 260, the receive task 261 and the repair task 262 of said control program 131 will be explained in detail.

Figure 12:
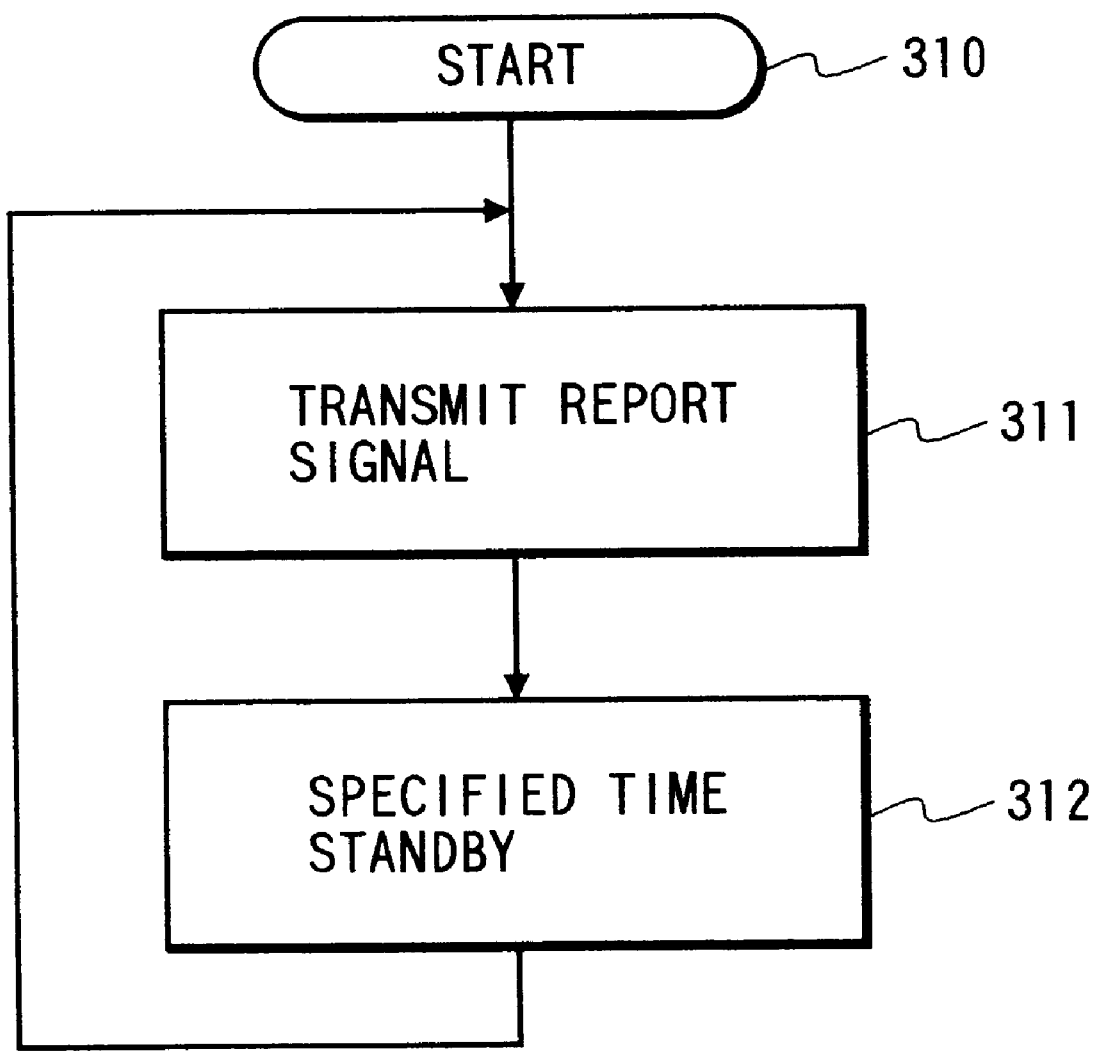
FIG. 12 is a flowchart showing the processing sequence of transmit of the report signal process task.

FIG. 12 shows the processing sequence for performing the (check-in) report transmit task 260. In this processing, as shown in the figure only a periodic (check-in) report is made to the other computer. In other words, this check-in report signal is sent by way of the SVP board to the other computer (process 311) and then shifts to standby for an amount of time set before hand (process 312) and the sequence then repeats.

Figure 13:
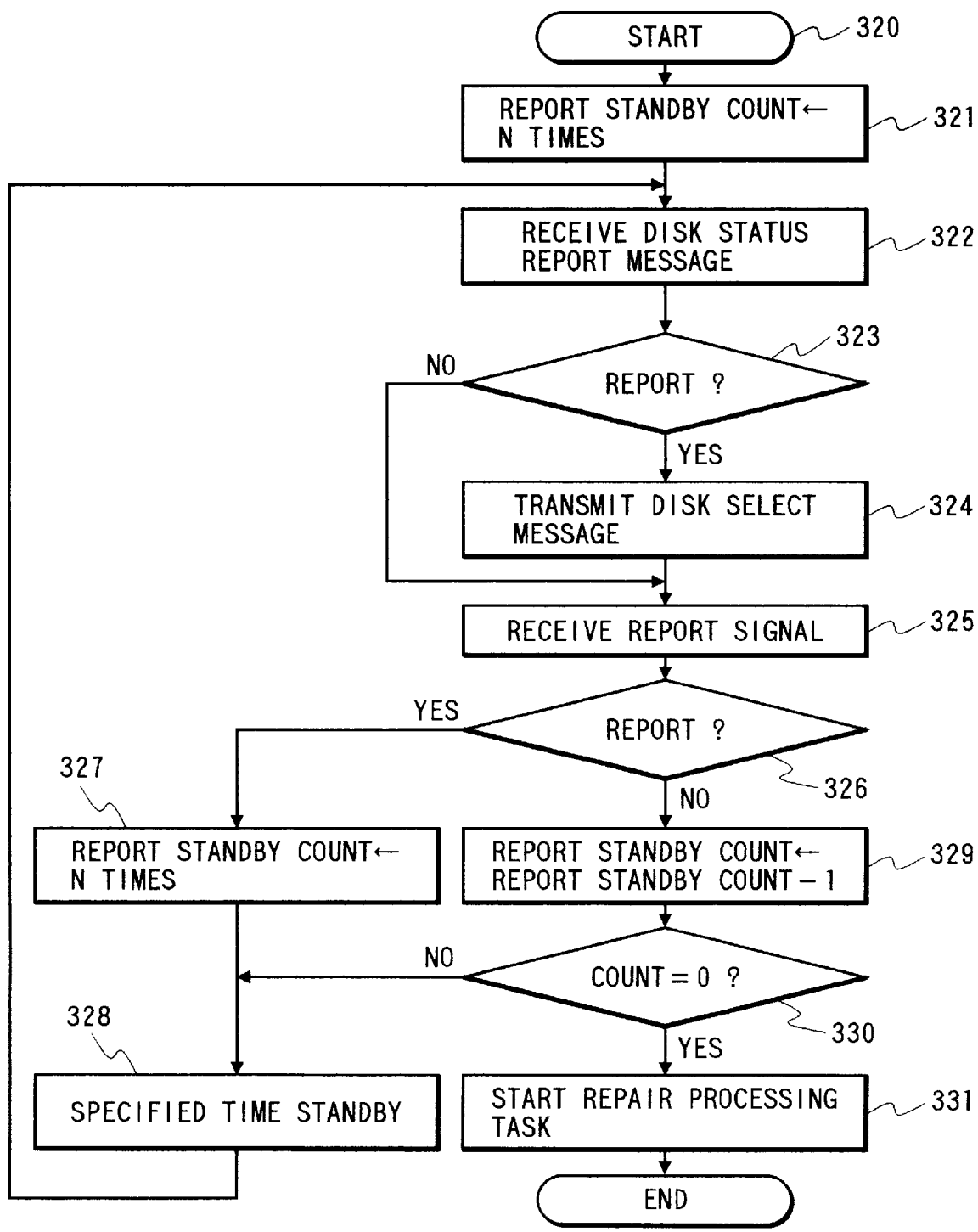
FIG. 13 is a flowchart showing the processing sequence for performing receive processing tasks.

The processing sequence for the receive task 261 shown in FIG. 13 is next explained. In the receive task 261, the check-in report signal and the disk status report are received at intervals.

In other words, the receiving of the disk status message is first checked (process 322), and whether or not the disk status report has actually arrived is determined in process 323. When the disk status report message shows that the common disk unit has malfunctioned, a disk switching command is sent (by way of the SVP board 115) to change all of the MOS switches 150–153 inside the common disk unit 102 to OFF status (setting in pattern "d" of FIG. 6). When the disk status report message shows that the malfunctioning common disk unit 102 has been reset, conversely a disk switching command is sent (process 324) to change the MOS switches 150–153 to a setting for correct operation (Any pattern setting of "a" "b" or "c" of FIG. 6) of the common disk unit 102.

The receive processing 325 of the check-in report signal is next performed but when this check-in report is not received in the receive task 261 within a specified time, the repair task 262 must start. The "Report Standby Count" is utilized as a control variable to start the repair task 262. The "Report Standby Count" is set to N times (process 321) beforehand as part of the reset process beforehand.

In the receive process 325 for the (check-in) report signal, a check (process 326) is made as to whether or not a check-in report signal has arrived from the other computer. If the check-in report signal has arrived then the resetting of the N count (process 327) is again performed and the sequence returns to the process 322. However, if the check-in report signal has not arrived in the process 326 then the value in the "Report Standby Count" is reduced by one unit (process 329) and a check of the value of this variable then made (process 330). If the check shows that the value in the "Report Standby Count" is zero, then the (check-in) report signal has not been received from the other computer in the time allowed for in the "N X×Presence report signal interval" so the repair task is then started up (process 331). When the value checked in the process 327 is found to be other than zero, the sequence is in standby for a specified time (process 328) and the sequence then returns to the process 322.

Setting the N value to two (2) or more allows responding to errors in one location such as in the high reliability control network. Further, as shown in FIG. 1, when the main computer 100 and the backup computer 102 are linked by two networks (Ethernet and the high reliability control network), one network will be able to withstand a communications error if both networks are set to transmit a (check-in) report signal. However, in networks subject to general use such as Ethernet, processing with automatic reset commands and disk switching messages is not appropriate from the aspect of high reliability so these control messages should preferably be used only on the high reliability control network.

Figure 14:
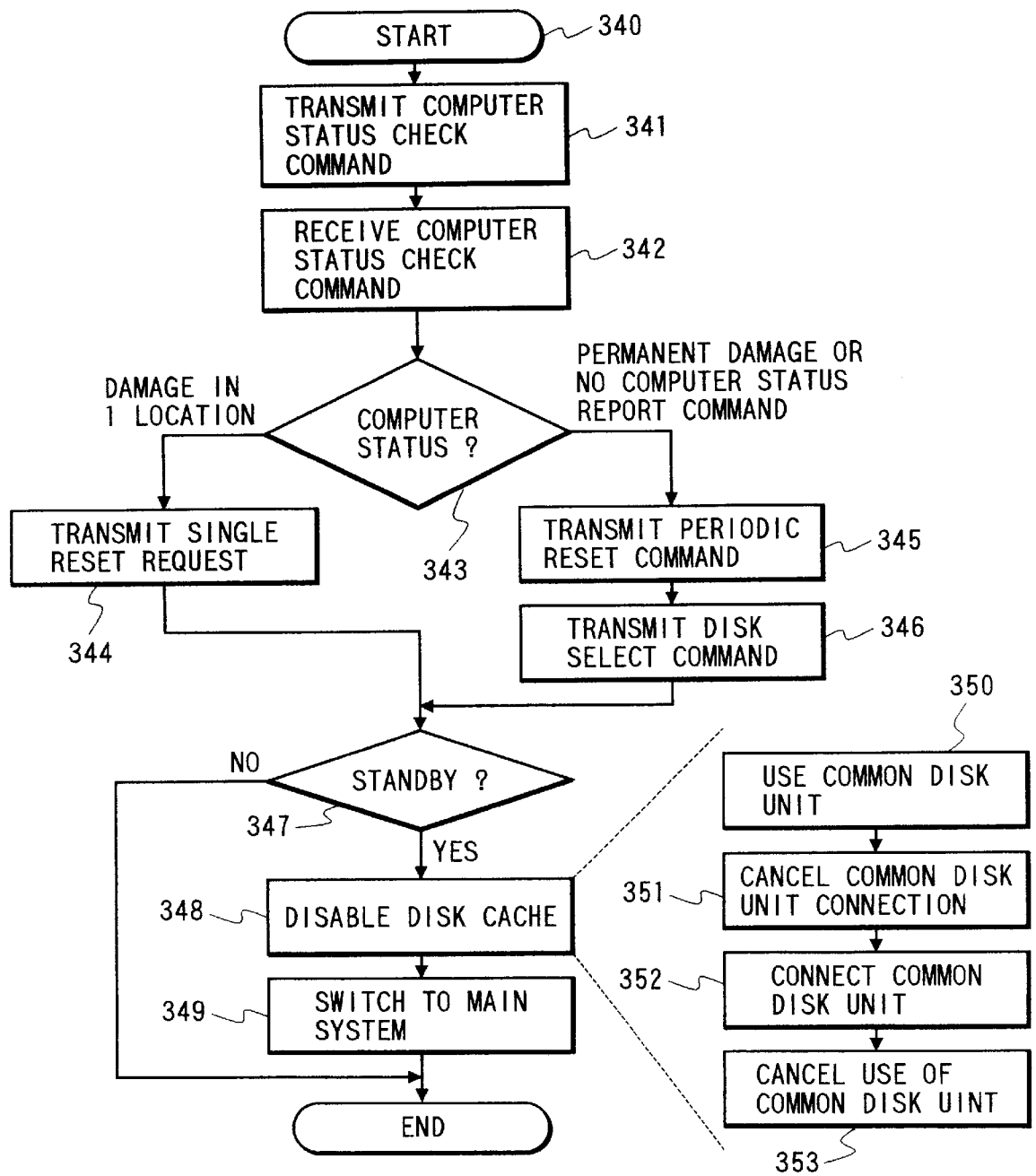
FIG. 14 is a flowchart a flowchart showing the processing sequence for performing malfunction processing tasks.

The processing sequence of the repair task 262 shown in FIG. 14 is described next.

First, in the process 341, a command to check the status of the malfunctioning computer is first sent to the SVP115 board of the malfunctioning computer and a report on the status of the malfunctioning computer then received (process 342).

Next, the extent of the malfunction in the computer is ascertained by means of process 343 and the reset method decided upon. A single reset command is sent (process 344) and restart attempted, if the malfunction is limited to one location in the computer and the computer can probably be restored to correct operation. However if the malfunctioning computer has permanent damage or the damage location occurs repeatedly then the continuous reset command is sent (process 345) and the malfunctioning computer isolated from the system to prevent the spread of adverse effects.

Further, when continuous reset is commanded, a disk switching command (command setting a pattern of FIG. 6b or 6c for MOS switches 150–153) is next issued (process 346) and the common disk unit 102 isolated from the malfunctioning computer. The common disk unit can therefore be normally referred to as needed even if the malfunctioning computer has been removed from the system.

Also possible is the omission of processes 341 through 344 and always applying the continuous reset method to the malfunctioning computer.

Next, when the main computer is the malfunctioning computer and the other computer is the backup (or slave) computer in standby, the backup computer must take over as the main computer and the processing performed by the malfunctioning computer must be continued, so first it must be determined if the backup computer is in standby or not (process 347) and when in standby, the disk cache is disabled (process 348), the application 135 loaded beforehand into the main storage unit 111 then run, and the backup computer shifted to the role of the main operating computer (process 349).

The process for performing the repair task 252 has previously been explained however in the event that the OS130 does not provide the system service of disabling the disk cache then processes 350–353 of FIG. 14 may be performed instead of the process 348 (disabling of disk cache) also in FIG. 14.

In other words, first the common disk unit 102 is itself locked (process 350) to prohibit referring to the disk by other than the control program 131. The electrical connections of the common disk unit 102 are then cancelled (or unmounted) by digital logic (process 351). In this process, the contents of the disk cache corresponding to the common disk unit 102 are rendered invalid. At this point, the connections to the common disk unit are again made (or mounted) by digital logic in the process 352 and finally, the common disk unit 102 is unlocked and its possession by the control program 131 is cancelled (process 353).

The OS has the following characteristics.

A first characteristic is that even if the disk unit has been unmounted, mounting will automatically be performed when the program attempts to refer to the disk unit.

A second characteristic is that unmounting can be performed without taking control of the disk unit.

Any of the processes 350 through 353 can thus be omitted. For instance, in an OS having the first characteristic, the process 352 can be omitted and for an OS having the second characteristic, the processes 350 and 353 can be omitted.

The above description explained one example of the redundant system of this invention. FIG. 15 shows a summary of the messages transmitted by way of the high reliability network 104. The message type, transmit origin, final receiver and the process details are shown in FIG. 15.

In this embodiment the control program may also be provided as a portion of the OS.

In the embodiment as described above, a high reliability multi-computer system can be structured utilizing an inexpensive personal computer. This multi-computer system is comprised of SVP boards, a high reliability control network and a control program however the application need not be restricted by these system elements. Accordingly, an application identical to that of the conventional art may also be utilized.

Further by permitting access to the data of the common disk unit, the main memory can be copied by the computers within the multi-computer system in order to configure a system of extremely low cost that also allows high speed switching between the main system and backup system.

Still further, when a computer malfunction has occurred, single reset can be performed for a malfunction occurring in one location and restart then attempted; or continuous reset can be performed for permanent type malfunctions so that processing can be performed according to the extent of the malfunction with the computer in which the malfunction occurred essentially disabled.

Yet still further, electrically isolating the malfunctioning equipment from the system permits replacement of the malfunctioning equipment without having to stop the system.

What is claimed is:

1. A multi-computer system comprising:
a plurality of computers including a main computer installed in a main system, said main computer executing a program, and a backup computer installed in a backup system, said backup computer having a disk cache having a contents and maintaining in a loaded state said program being executed by said main computer and a common external disk unit shared by said plurality of computers, said system arranged such that, when a malfunction occurs in the main computer installed in the main system, the program execution by the main computer is carried out by the backup computer installed in the backup system and the contents of the backup computer disk cache is rendered invalid each of said plurality of computers operating autonomously with regard to its processing and being equipped with function expansion boards connected alternately by way of transmission paths, and said function expansion boards having:
   a reset request means for selectively sending either a single reset request or a continuous reset request by way of said transmission path to the function expansion board installed in the computer other than the computer where the malfunction occurred and,
   a reset means to instantaneously reset or cancel reset of the computer equipped with said function expansion boards when a single reset request is received by way of said transmission path from the function expansion board installed in another computer; and to perform continual reset when a continuous reset request is received by say of said transmission path from the function expansion board installed in another computer.

2. A multi-computer system according to claim 1 wherein,
said computers are provided with a control means for operating the processes of said computers and,
said function expansion board is provided with a notification means to monitor the status of other computers equipped with said function expansion boards and notify the other expansion boards by way of said transmission path of the status of the computer being monitored, and
a report means for reporting to the control means of the computer equipped with said function expansion board, the status of the other computer which was received from the other computer, and when a malfunction in the other computer occurs,
said control means selecting either a single reset request or a continuous reset request and conveying the reset request to the function expansion board according to the computer status of the other computer reported from the function expansion board,
a reset request means sending a single reset request or a continuous reset request conveyed from said control means, to the expansion function board of the other computer equipped with the function expansion board when a malfunction has occurred.

3. A multi-computer system comprising:
a plurality of computers including a main computer installed in a main system, said main computer executing a program, and a backup computer installed in a backup system, said backup computer having a disk cache having a contents and maintaining in a loaded state said program being executed by said main computer and a common external disk unit shared by said plurality of computers, said system arranged such that, when a malfunction occurs in the main computer installed in the main system, the program execution by the main computer is carried out by the backup computer installed in the backup system
each computer having a respective disk cache for said common disk unit and,
said backup computer having a disabling means to render the contents of the disk cache invalid prior to taking over the processing from the main computer when a malfunction has occurred in the main computer.

4. A multi-computer system according to claim 3 wherein, said disabling means renders the contents of the disk cache invalid by temporarily cancelling or unmounting common disk unit logic connections.

5. A multi-computer system comprising:
   a plurality of computers including a main computer installed in a main system, said main computer executing a program, and a backup computer installed in a backup system, said backup computer having a disk cache having a contents and maintaining in a loaded state said program being executed by said main computer and a common external disk unit shared by said plurality of computers, said system arranged such that, when a malfunction occurs in the main computer installed in the main system, the program execution by the main computer is carried out by the backup computer installed in the backup system and the contents of the backup computer disk cache is rendered invalid
   a notification means to monitor the status of other computers equipped with said function expansion boards and notify the other expansion boards by way of said transmission path of the status of the computer being monitored and,
   a cancelling mans for cancelling the electrical connections between the common disk unit and said computer, in response to the instructions received from the other computer.

6. A multi-computer system comprising:
   a plurality of computers including a main computer installed in a main system, said main computer executing a program, and a backup computer installed in a backup system, said backup computer having a disk cache having a contents and maintaining in a loaded state said program being executed by said main computer and a common external disk unit shared by said plurality of computers, said system arranged such that, when a malfunction occurs in the main computer installed in the main system, the program execution by the main computer is carried out by the backup computer installed in the backup system and the contents of the backup computer disk cache is rendered invalid, said computer having:
   a command means for issuing a command to said common disk unit to cancel electrical connections between said malfunctioning computer and the other computer when the computer malfunction is detected, and said common disk unit having
   a switch for cancelling each of the electrical connections between said computers and
   a control means for controlling said switch in response to commands from said computer and for cancelling the electrical connections with the malfunctioning computer.

7. A multi-computer system comprised of a first computer, a second computer and a common disk unit shared by said first computer and said second computer and when a computer set from among the first computer and second computer as the main computer in the main system malfunctions, the other computer set as the backup computer takes over to perform the processing of the main computer; in which system,
   said first computer and common disk unit and said second computer being connected in a digital loop by means of a bus type transmission path in the order of first computer, common disk unit and second computer, said first computer and said second computer having
   a command means for issuing a command to said common disk unit to cut off electrical connections with the other computer when a malfunction is detected in the other computer, and said common disk unit comprises;
   a first switch for cutting off the electrical connections with the first computer,
   a second switch for cutting off the electrical connections with the second computer,
   a terminator resistor for terminating said transmission path,
   a third switch for switching to said terminator resistor instead of the transmission path of said first computer,
   a fourth switch for switching to said terminator resistor instead of the transmission path of said second computer,
   and along with controlling said first switch or said second switch,
   electrically cutting off the transmission path with said malfunctioning computer in response to a command from said first computer or said second computer; also controlling said third switch or said fourth switch to make electrical connections with said terminator resistor instead of the transmission path that was cut off.

8. A multi-computer system comprised of a first computer, a second computer and a common external disk unit shared by said first computer and said second computer, and when a computer set from among the first computer and second computer as the main computer in the main system malfunctions, the other computer set as the backup computer takes over to perform the processing of the main computer; said multi-computer system is comprising the steps of; in the first computer installed in the main system,
   running an operating system incorporating the file system from the common external memory device and an application for job task processing utilizing said common external memory device; and the in second computer installed in the backup system
   running the operating system incorporating the file system of said common external memory device and also the program for monitoring the status of the first computer, at this same time
   an application being loaded for performing job task processing while utilizing said common external memory device and maintaining this status; when the control program of the second computer detects a malfunction in the first computer,
   a specified process in said control program resetting the first computer,
   setting the first computer as the backup computer, and the second computer as the main computer, whereupon
   starting up the second computer and running said application.

9. A multi-computer system comprising:
   a main computer which has a disk cache, said main computer executing a program;
   a backup computer connected to said main computer via a network, said backup computer having a disk cache having a contents and maintaining in a loaded state said program being executed by said main computer, for executing said program instead of said main computer;
   a common disk unit which is connected to said main computer and said backup computer, and wherein said backup computer is adapted to reset said main computer, render said contents of said disk cache invalid, and take over processing of said program from said main computer when a malfunction has occurred in said main computer.

10. A multi-computer system comprising:

a main computer which has a disk cache with a contents, said main computer executing a program;

a backup computer connected to said main computer via a network, said backup computer having a disk cache having a contents and maintaining in a loaded state said program being executed by said main computer, for executing said program instead of said main computer;

a common disk unit which is connected to said main computer and said backup computer, and wherein said backup computer is adapted to reset said main computer without resetting the backup computer, render said contents of its own disk cache invalid, and takes over processing of said program from said main computer when a malfunction has occurred in said main computer.

* * * * *

UNITED STATES PATENT AND TRADEMARK OFFICE
CERTIFICATE OF CORRECTION

PATENT NO.   : 6,138,248
DATED        : October 24, 2000
INVENTOR(S)  : Masahiko Saito, et al.

It is certified that error appears in the above-identified patent and that said Letters Patent is hereby corrected as shown below:

Column 4,
Line 54, delete "a flowchart" (second occurrence).

Column 5,
Line 3, change "101 and 101" to -- 100 and 101 --.
Line 56, change "perform" to -- performs --.

Column 8,
Line 46, change "transmit" to -- transmitted --.

Column 9,
Line 12, change "store" to -- stored --.

Column 12,
Line 11, change "or" to -- of --.

Column 13,
Line 31, after "figure" insert a comma.

Column 16,
Line 23, change "say" to -- way --.

Signed and Sealed this

Second Day of October, 2001

*Attest:*

NICHOLAS P. GODICI
*Attesting Officer*     Acting Director of the United States Patent and Trademark Office

UNITED STATES PATENT AND TRADEMARK OFFICE
CERTIFICATE OF CORRECTION

PATENT NO.   : 6,138,248
DATED        : October 24, 2000
INVENTOR(S)  : Masahiko Saito et al.

It is certified that error appears in the above-identified patent and that said Letters Patent is hereby corrected as shown below:

Column 4,
Line 54, delete "a flowchart" (second occurrence).

Column 5,
Line 3, change "101 and 101" to -- 100 and 101 --.
Line 56, change "perform" to -- performs --.

Column 8,
Line 46, change "transmit" to -- transmitted --.

Column 9,
Line 12, change "store" to -- stored --.

Column 12,
Line 11, change "or" to -- of --.

Column 13,
Line 31, after "figure" insert a comma.

Column 16,
Line 23, change "say" to -- way --.

Signed and Sealed this

Nineteenth Day of October, 2004

JON W. DUDAS
*Director of the United States Patent and Trademark Office*